United States Patent
Kilday (10) Patent No.: US 9,754,119 B1
(45) Date of Patent: Sep. 5, 2017

(54) CONTAINERIZED SECURITY FOR MANAGED CONTENT

(75) Inventor: Roger W. Kilday, Livermore, CA (US)

(73) Assignee: EMC Corporation, Hopkinton, MA (US)

( * ) Notice: Subject to any disclaimer, the term of this patent is extended or adjusted under 35 U.S.C. 154(b) by 1228 days.

(21) Appl. No.: 11/370,293

(22) Filed: Mar. 7, 2006

(51) Int. Cl.
*G06F 17/00* (2006.01)
*G06F 21/62* (2013.01)
*G06F 9/44* (2006.01)

(52) U.S. Cl.
CPC ........ *G06F 21/6209* (2013.01); *G06F 9/4443* (2013.01); *G06F 21/62* (2013.01); *G06F 21/6218* (2013.01)

(58) Field of Classification Search
USPC .................................. 380/277; 715/209, 277
See application file for complete search history.

(56) References Cited

U.S. PATENT DOCUMENTS

| | | | |
|---|---|---|---|
| 5,107,443 A | 4/1992 | Smith et al. | |
| 5,793,365 A | 8/1998 | Tang et al. | |
| 5,930,801 A | 7/1999 | Falkenhainer et al. | |
| 5,956,715 A * | 9/1999 | Glasser et al. | |
| 6,233,600 B1 | 5/2001 | Salas et al. | 709/201 |
| 6,311,269 B2 * | 10/2001 | Luckenbaugh et al. | 713/154 |
| 6,505,300 B2 * | 1/2003 | Chan et al. | 713/164 |
| 6,557,013 B1 | 4/2003 | Ziff et al. | |
| 6,564,246 B1 * | 5/2003 | Varma et al. | 709/205 |
| 6,671,695 B2 | 12/2003 | McFadden | |
| 7,003,502 B1 | 2/2006 | Wizdo et al. | |
| 7,031,957 B2 | 4/2006 | Harris | |
| 7,124,101 B1 | 10/2006 | Mikurak | |
| 7,130,807 B1 | 10/2006 | Mikurak | |
| 7,139,973 B1 | 11/2006 | Kirkwood et al. | |
| 7,139,999 B2 | 11/2006 | Bowman-Amuah | |
| 7,149,698 B2 | 12/2006 | Guheen et al. | |
| 7,162,504 B2 | 1/2007 | McCauley et al. | |
| 7,165,041 B1 | 1/2007 | Guheen et al. | |
| 7,167,844 B1 | 1/2007 | Leong et al. | |
| 7,191,397 B2 | 3/2007 | Brooke et al. | |
| 7,236,966 B1 | 6/2007 | Jackson et al. | |
| 7,236,975 B2 | 6/2007 | McCauley et al. | |
| 7,236,989 B2 | 6/2007 | McCauley et al. | |

(Continued)

OTHER PUBLICATIONS

Ming-Ju Yang, Wen-Chung Chang, Win-Jet Luo, Shou-Ping Hsu, Kao-Feng Yarn, Tsung-Chan Cheng, and Po-Chun Yang, "A User-Friendly Web Content Management System", Innovative Computing Information and Control, 20008. ICICIC '08. 3$^{rd}$ International Conference on Jun. 18-20, 2008 pp. 367-367 Digital Object Identifier 10.1109/ICICIC.2008.102.

(Continued)

*Primary Examiner* — Keith Bloomquist
(74) *Attorney, Agent, or Firm* — Van Pelt, Yi & James LLP (57) ABSTRACT

Containerized security is disclosed. An indication is received that a content item included in a body of managed content is associated with a container. A security measure is associated with the content item, based at least in part on the association of the content item with the container, that causes access to the content item by a user who is not associated with the container but who otherwise would have access to the content item within the body of managed content to be denied.

15 Claims, 9 Drawing Sheets

(56) References Cited

U.S. PATENT DOCUMENTS

| | | | |
|---|---|---|---|
| 7,236,990 B2 | 6/2007 | McCauley et al. | |
| 7,240,076 B2 | 7/2007 | McCauley et al. | |
| 7,246,138 B2 | 7/2007 | McCauley et al. | |
| 7,254,836 B2 | 8/2007 | Alkove et al. | |
| 7,260,584 B2 | 8/2007 | Hailey et al. | |
| 7,287,218 B1 | 10/2007 | Knotz et al. | |
| 7,296,296 B2 | 11/2007 | Dunbar et al. | |
| 7,315,826 B1 | 1/2008 | Guheen et al. | |
| 7,403,901 B1 | 7/2008 | Carley et al. | |
| 7,415,478 B2 | 8/2008 | Owen et al. | |
| 7,415,484 B1 | 8/2008 | Tulkoff et al. | |
| 7,433,896 B2 | 10/2008 | Owen et al. | |
| 7,440,863 B2 | 10/2008 | Manfredi | |
| 7,512,578 B2 | 3/2009 | Abnous et al. | |
| 7,702,730 B2* | 4/2010 | Spataro et al. | 709/205 |
| 7,752,258 B2 | 7/2010 | Lewin et al. | |
| 7,912,799 B2 | 3/2011 | Abnous et al. | |
| 8,280,917 B1 | 10/2012 | Wei et al. | |
| 8,290,947 B2 | 10/2012 | Brette et al. | |
| 8,312,062 B1 | 11/2012 | Spivak et al. | |
| 8,341,299 B2 | 12/2012 | Wei et al. | |
| 8,347,295 B1 | 1/2013 | Robertson et al. | |
| 8,347,321 B1 | 1/2013 | Spivak et al. | |
| 8,375,015 B2 | 2/2013 | Wei et al. | |
| 8,386,608 B1 | 2/2013 | Rankov et al. | |
| 8,396,938 B2 | 3/2013 | Oscherov et al. | |
| 8,400,407 B2 | 3/2013 | Oleskevich et al. | |
| 8,447,827 B2 | 5/2013 | Oscherov et al. | |
| 8,539,493 B1 | 9/2013 | Robertson et al. | |
| 8,560,572 B2 | 10/2013 | Wei et al. | |
| 8,595,265 B2 | 11/2013 | Wei et al. | |
| 8,612,635 B2 | 12/2013 | Wei et al. | |
| 8,650,224 B2 | 2/2014 | Wei et al. | |
| 8,655,857 B1 | 2/2014 | Oscherov et al. | |
| 8,656,410 B1 | 2/2014 | Wei et al. | |
| 8,682,827 B2 | 3/2014 | Abnous et al. | |
| 8,694,546 B2 | 4/2014 | Wei et al. | |
| 8,732,141 B2 | 5/2014 | Randall et al. | |
| 8,782,096 B2 | 7/2014 | Abnous et al. | |
| 8,812,683 B2 | 8/2014 | Rankov et al. | |
| 8,819,048 B1 | 8/2014 | Abnous et al. | |
| 8,826,280 B1 | 9/2014 | Robertson et al. | |
| 2002/0194485 A1* | 12/2002 | Ram et al. | 713/193 |
| 2004/0111423 A1 | 6/2004 | Irving et al. | |
| 2004/0168058 A1 | 8/2004 | Margolus | |
| 2004/0239700 A1* | 12/2004 | Baschy | 345/781 |
| 2005/0039034 A1* | 2/2005 | Doyle et al. | 713/193 |
| 2005/0182641 A1 | 8/2005 | Ing et al. | |
| 2005/0193236 A1 | 9/2005 | Stager et al. | |
| 2006/0080316 A1* | 4/2006 | Gilmore et al. | 707/9 |
| 2006/0101017 A1 | 5/2006 | Eder | |
| 2006/0265375 A1* | 11/2006 | Hess | 707/9 |
| 2007/0204078 A1 | 8/2007 | Boccon-Gibod et al. | |
| 2007/0276878 A1 | 11/2007 | Zheng et al. | |

OTHER PUBLICATIONS

M.C. D'Ornellas, "Applying Digital Rights Management to Complex Content Management Systems", Computational Science and Engineering, 2008. CSE '08. 11th IEEE International Conference on Jul. 16-18, 2008 pp. 429-435 Digital Object Identifier 10.1109/CSE.2008.64.

J. Souer and M. Van Mierloo. "A Component Based Architecture for Web Content Management: Runtime Deployable WebManager Component Bundles", Web Engineering, 2008. ICWE '08. Eighth International Conference on Jul. 14-18, 2008 pp. 366-369 Digital Identifier 10.1109/ICWE.2008.32.

Sung Ho Jang, Chang Hyeon Noh, and Jong Sik Lee, "Semantic Web-Based Digital Content Management in Grid Computing" Semantic Computing and Applications, 2008. IWSCA '08. IEEE International Workshop on Jul. 10-11, 2008 pp. 129-131 Digital Object Identifier 10.1109/IWSCA.2008.8.

O-Hoon Choi, Jung-Eun Lim, Dong-Hyun Lee, Hong-Seok Na, and Doo-Kwon Baik, "A multimedia contents management system based on a metadata-net in home network" Consumer Electronics, IEEE Transactions on vol. 54, Issue 2, May 2008 pp. 468-473 Digital Object Identifier 10.1009/TCE.2008.4560116.

W. Harrison, "Content Mismanagement Systems" Software, IEEE vol. 23, Issue 1, Jan.-Feb. 2006 pp. 5-8 Digital Object Identifier 10.1109/MS.2006.7.

M. Grossniklaus, M.C. Norrie, B. Signer, and N. Weibel, "Producing Interactive Paper Documents Based on Multi-Channel Content Publishing", Automated Production of Cross Media Contect for Multi-Channel Distribution, 2007. AXMEDIS '07. Third International Conference on Nov. 28-30,. 2007 pp. 89-96 Digital Object Identifier 10.1109/AXMEDIS.2007.22.

Feng-Hsu Wang, "A Contextualization Method of Browsing Events in Web-based Learning Content Management System for Personalized Learning", Advanced Learning Technologies, 2007. ICALT 2007. Seventh IEEE International Conference on Jul. 18-20, 2007 Digital Object Identifier 10.1109/ICALT.2007.9.

"KBMS-Prototype KRISYS usermanual overview" KBMS-Prototype KRISYS User Manual, Dec. 1, 1992, pp. 1-94, XP002193794.

Mattos N M et al.: "Grand tour of concepts for obect-orientation from a database point of view" Data & Knowledge Engineering, Amsterdam, NL, vol. 9, No. 3, Jan. 1, 1992, pp. 321-352, XP009020749.

Bertino E et al.: "Object-Oriented Database Management Systems: Concepts and Issues" Computer, IEEE Service Center, Los Alamitos, CA US, vol. 24, No. 4, Apr. 1, 1991, pp. 33-47, XP000227753 ISSN: 0018-9162.

Chowdhury et al., Logical vs Numerical Inference on Statistical Databases, Proceedings of the 29th Annual Hawaii International Conference on System Sciences, 1996, pp. 3-10.

Hayashi et al., A Network-Centric Approach to Low-Power Consumption Sensor-Network with Related Service Intergration, SICE Annual Conference 2012, Aug. 20-23, Akita University, Akita , Japan, pp. 1433-1436.

Hayashi et al., A Network-Centric Approach to Sensor-Data and Service Intergration, SICE Annual Conference 2011, Sep. 13-18, 2011, Waseda University, Tokyo, Japan, pp. 2037-2042.

Shankar et al., Managing Pervasive Systems Using Role-Based Obligation Policies, 2006, Fourth Annual IEEE International Conference on DOI.

Weingroff et al., Tools for Managing Collaboration, Communication, and Website Content Development in a Distributed Digital Library Community, JCDL, Jun. 7-11, 2005.

Stephen P. Levitt, C++: An Evolving Language, IEE Africon, pp. 1197-1202, 2004.

* cited by examiner

CONTAINERIZED SECURITY FOR MANAGED CONTENT

BACKGROUND OF THE INVENTION

A useful aspect of content management systems is the functionality that is built into the content management system including being able to apply uniform policies to content managed by the system (for example, access, retention services, searching services, version control, backup, etc.). However, the ability for these services to access all the content under management can be problematic for security. For example, using a global search in some cases would show the existence of documents that should be kept secret (for example, a reduction in force plan, a merger or acquisition proposal, etc.). In some cases, it would be useful for a small group of users to be able to take advantage of the capabilities of the content management system with regard to accessing a specific set of content items or objects to the exclusion of other users of the content management system.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Containerized security is disclosed. An indication is received that a content item included in a body of managed content is associated with a container. Container security is imposed on the content item, resulting in some embodiments in the content item being accessible to one or more users who are members of a collaboration or other group with which the container is associated but not accessible to users, e.g., of a content management system used to store and/or manage the body of managed content, who are not members. In some embodiments, containerized security for managed content uses a combination of access control objects and aspects to ensure that a defined subset of content, such as content "governed" or controlled by room security, remains subject to a security policy associated with the subset of content.

Figure 1:
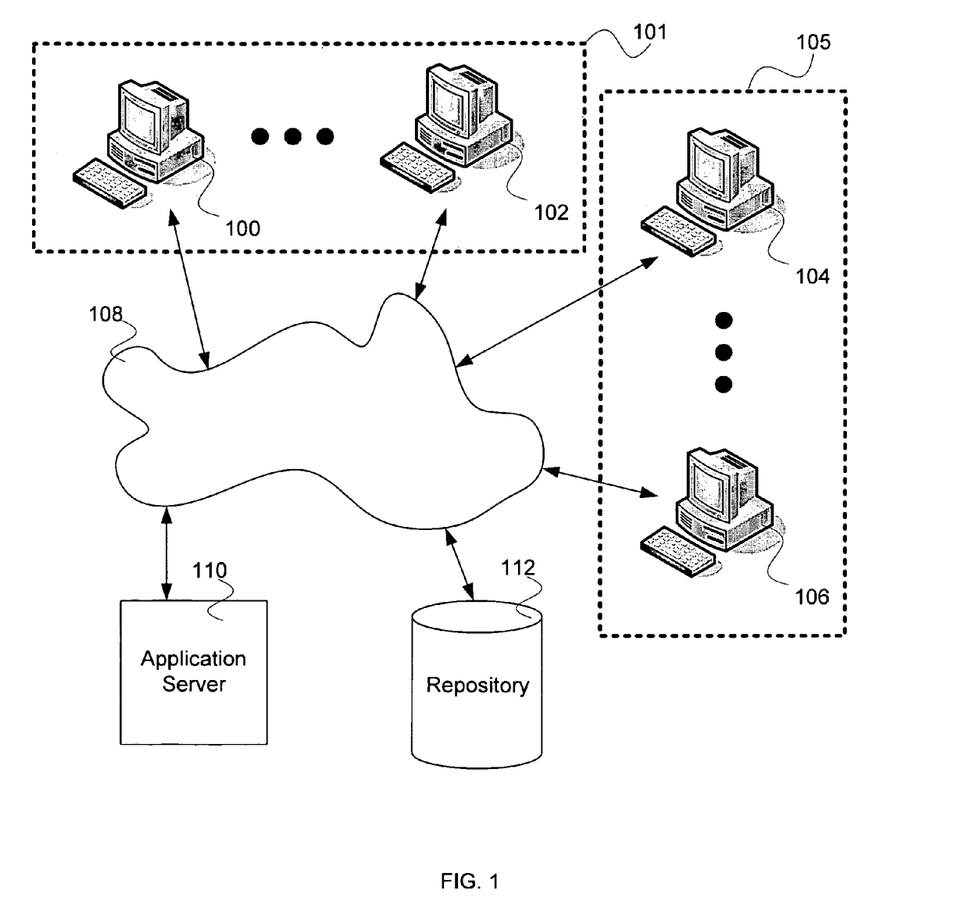
FIG. 1 is a block diagram illustrating an embodiment of a system for associating stored content with a collaboration environment.

FIG. 1 is a block diagram illustrating an embodiment of a system for associating stored content with a collaboration environment. In the example shown, users that are members of a collaboration use a computer or terminal, represented in FIG. 1 by the group 101 of 100 and 102, to interact with a system for associating stored content with a collaboration environment. Computer 100 and computer 102 are coupled to network 108. Users that are not members of the collaboration, but who are users authorized to access at least some content stored in repository 112, use a computer or terminal, represented in FIG. 1 by the group 105 of 104 and 106, to interact with a system for associating stored content with a collaboration environment. Computer 100 and computer 102 are coupled to network 108. In various embodiments, network 108 is the Internet, a local area network, a wide area network, a wired network, a wireless network, or any other network that can enable a user to access stored system content. Application server 110 and repository 112 are also coupled to network 108. Application server 110 includes one or more applications that are used when accessing content stored in repository 112. Application server 110 also includes applications used for creating, maintaining, and operating a collaboration environment. In some embodiments, application server 110 includes two or more physical computer systems. In some embodiments, the application(s) used to store content in repository 112, on the one hand, and the application(s) used to provide the collaboration environment, on the other hand, reside in separate physical computer systems. In some embodiments, a collaboration environment comprises a virtual workspace in which members can, based on assigned privileges, collaborate for work including accessing, modifying, reviewing, authorizing, approving, and/or removing content stored on repository 112. In some embodiments, only members can view and access content associated with the collaboration environment. In some embodiments, application server 110 comprises a content management system. In various embodiments, application server 110 comprises one or more processors, one or more memories, and one or more storage devices and can be implemented using one or more physical box units. In various embodiments, repository 112 comprises one or more storage devices and/or one or more processors or one or more memories and can be implemented using one or more physical box units. In some embodiments, application server 110 and repository 112 are combined in one physical unit or system.

Figure 2:
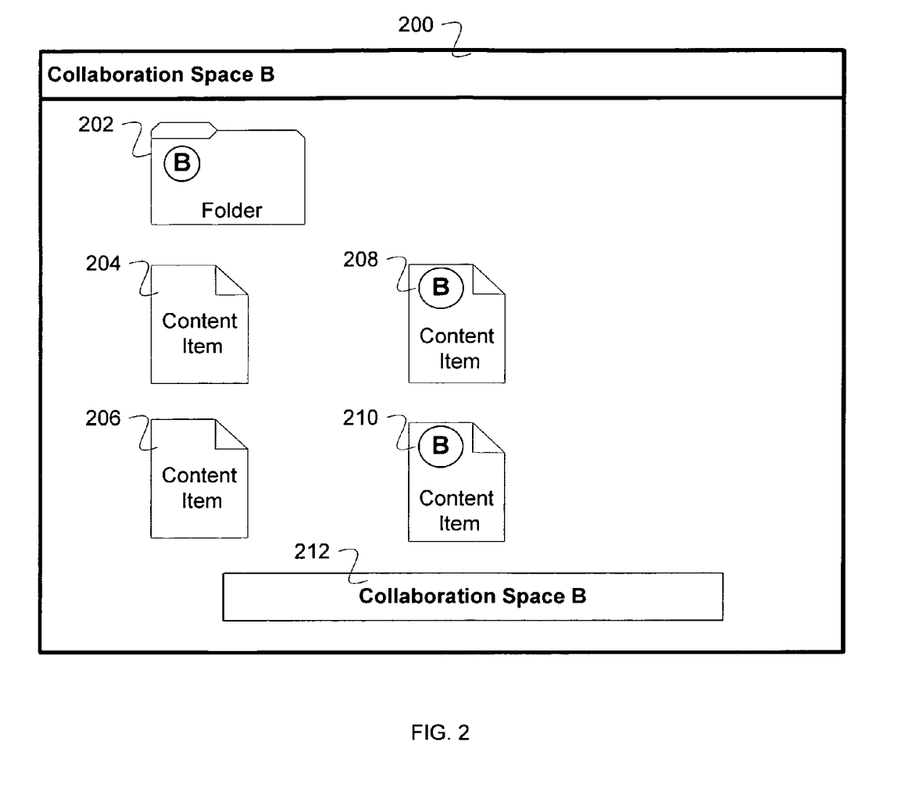
FIG. 2 is a block diagram illustrating one embodiment of items in a collaboration space.

FIG. 2 is a block diagram illustrating one embodiment of items in a collaboration space. In the example shown, window 200 is collaboration space B. In some embodiments, window 200 is displayed when a member of collaboration space B, such as a user using computer 100 or computer 102 of FIG. 1, views collaboration space B. Window 200 contains displays of content—for example, content item 208 and content item 210, or a group of content or folder—for example folder 202 associated with collaboration space B. Content item 204 and content item 206 are associated with collaboration B, but are shared and so are not exclusively governed by the rules of collaboration space B. In some embodiments, it is not necessarily the case at any given time that all content items governed by collaboration space rules will be displayed in window 200. In some embodiments, content items that are governed by collaboration space rules are not in window 200, but are still only visible to collaboration space members. In some embodiments, items that are governed by collaboration space rules are indicated visually—for example, with a symbol, a variation of the icon, and/or a change in the icon. Banner 212 identifies window 200 as being collaboration environment B. In some embodiments, there is no banner 212 identifying window 200 as being collaboration environment B.

Figure 3:
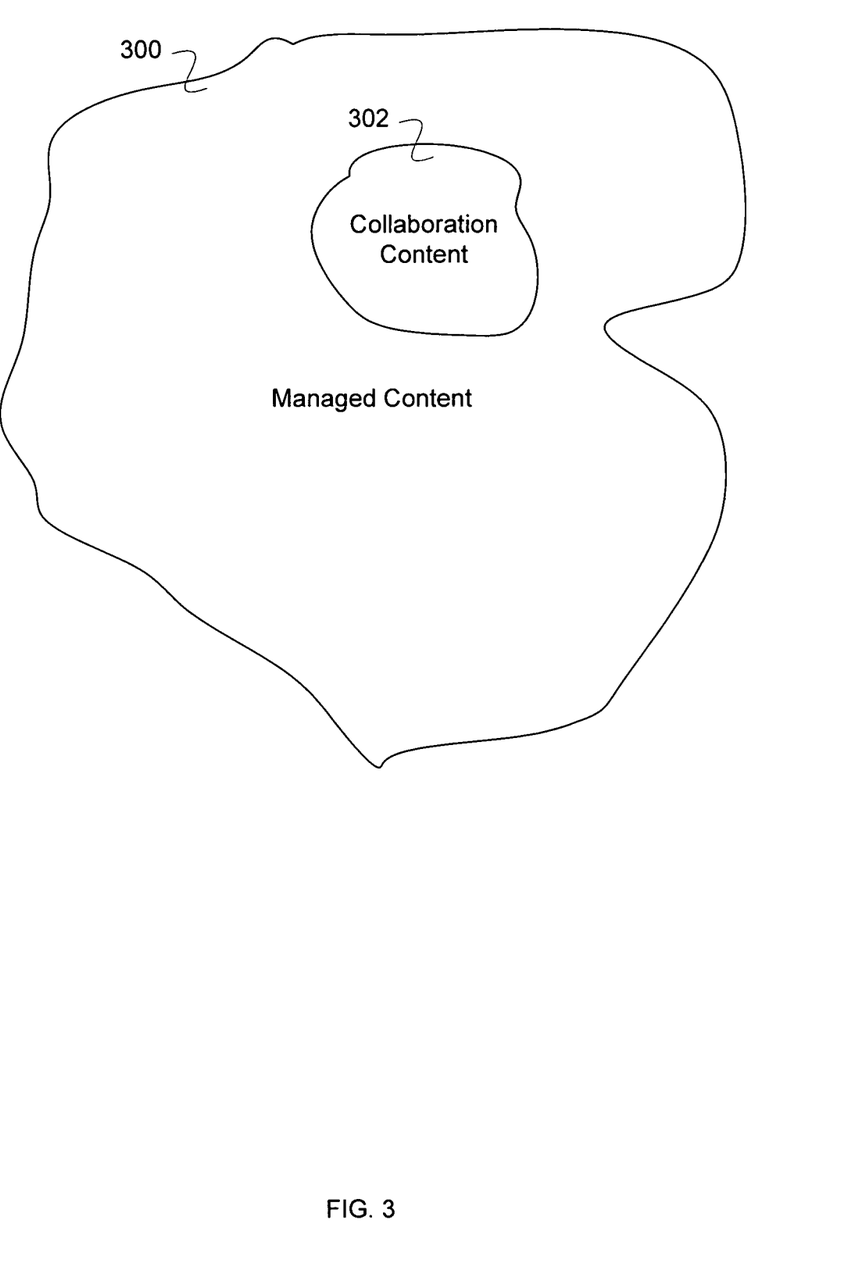
FIG. 3 is a block diagram illustrating one embodiment of collaboration content and managed content.

FIG. 3 is a block diagram illustrating one embodiment of collaboration content and managed content. In the example shown, managed content 300 is content that is associated with system such as the system in FIG. 1. In some embodiments, the system is a content management system. In some embodiments, managed content 300 comprises content that is managed by a content management system with functionality such as retention services, search services, security services, etc. Collaboration content 302 is a subset of managed content 300. Collaboration content 302, once associated with a collaboration space, in some embodiments is not visible or accessible to nonmembers of the collaboration space. In some embodiments, collaboration content includes a first type of content that is associated exclusively with the collaboration environment and not accessible to users who are not members of the collaboration and a second type of content that is associated with the collaboration environment in a non-exclusive manner, i.e., members of the collaboration and non-members alike may access the content. A collaboration space allows the members to work on documents that are part of collaboration content 302, in an embodiment in which collaboration content 302 comprises content of the first type described above, i.e., content associated exclusively with the collaboration environment, without the documents appearing or being able to be accessed by any application (for example, system wide search) or system user (for example, an executive at another location) other than a member of the collaboration space. In some embodiments, a collaboration space is created to hold content which members collaborate on in a secure environment (for example, an environment for working on a set of documents involving a merger or acquisition, a reduction in force, a restructuring, etc.).

Figure 4:
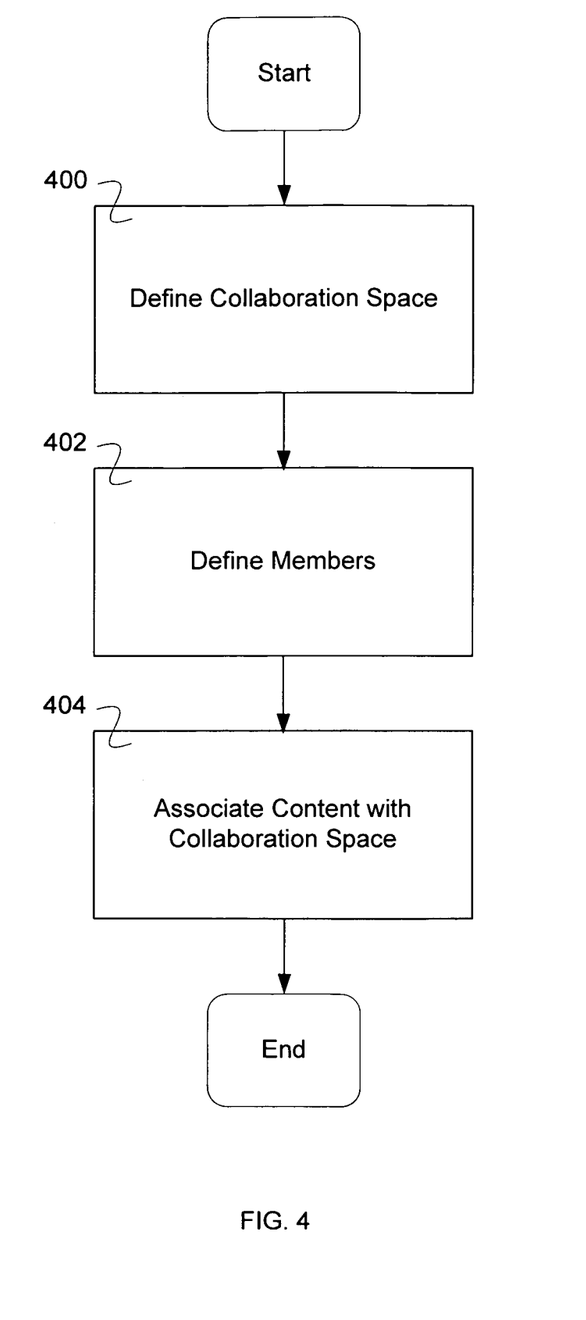
FIG. 4 is a flow diagram illustrating an embodiment of a process for associating stored content with a collaboration environment.

FIG. 4 is a flow diagram illustrating an embodiment of a process for associating stored content with a collaboration environment. In the example shown, in 400 a collaboration space is defined. In some embodiments, a collaboration space is created by opening a new folder, directory, project, etc., using a collaboration software application and/or tool, such as the eRoom™ and/or other virtual "room" or collaboration space functionality provided by the eRoom™ and/or certain Documentum™ software available from EMC Corp. of Hopkinton, Mass. In 402, members of the collaboration are defined. Members are defined for the collaboration in various ways including by entering a list, by clicking on icons representing users, by highlighting users in a list, using pull down menus, or any other way in which one or more users can be indicated to be members. In some embodiments, member rights and privileges are selected in 402. In various embodiments, member rights are selected by individually assigning members' rights such as read, write, edit, delete, approval, and/or other rights and privileges, by using a default setting for roles, or by assigning a role to a member where the role has rights and privileges associated with it. In 404, content is associated with the collaboration space. Content is associated with the collaboration space in various ways including in response to users creating documents in the collaboration space, saving documents to the collaboration space, dragging and dropping documents into the collaboration space, or any other way of populating the collaboration space. In some embodiments, 404 includes responding to an indication that content is to be associated with the collaboration space by creating in an underlying content management platform used to manage a body of managed content in which the collaboration space content resides and/or is to be included an association between the content item and the collaboration space. In some embodiments, 404 includes defining a logical container, e.g., a folder or subdirectory, and linking to the logical container content items associated with the collaboration space.

Figure 5:
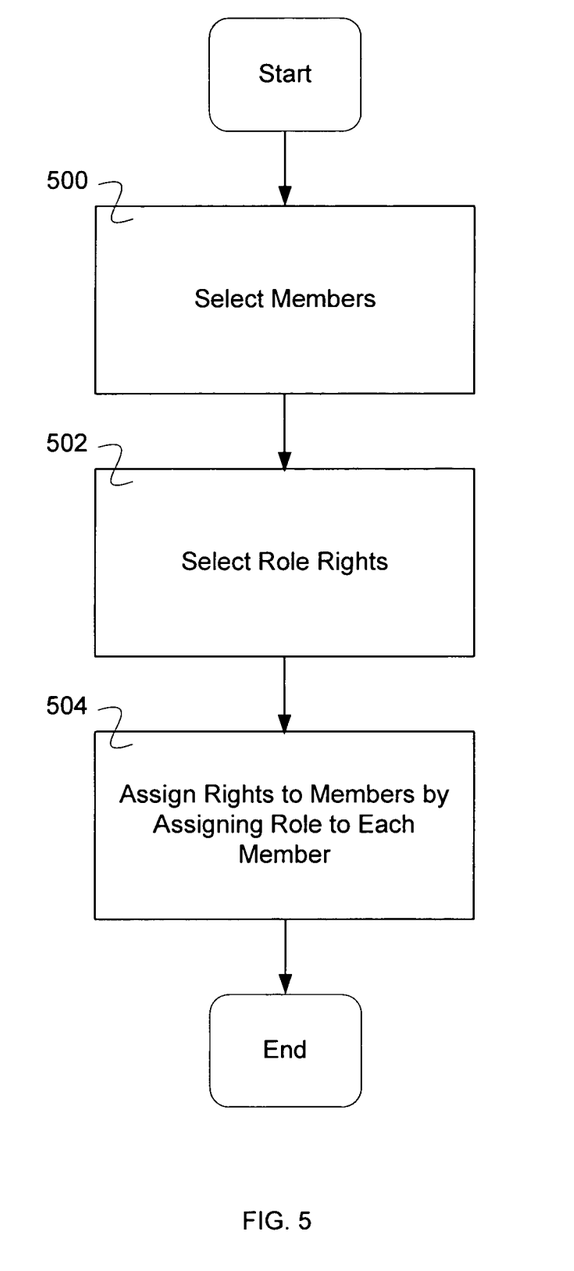
FIG. 5 is a flow diagram illustrating an embodiment of a process for defining members of a collaboration space.

FIG. 5 is a flow diagram illustrating an embodiment of a process for defining members of a collaboration space. In some embodiments, the process of FIG. 5 implements 402 of FIG. 4. In the example shown, in 500 members are selected. One or more members are selected by indicating that a system user is to be part of the collaboration environment. In some embodiments, indicating that a user is to be part of a collaboration environment includes listing a user in a user interface that is part of a setup application for the collaboration space such as a collaboration space setup wizard. In some embodiments, the user is notified by email, by text message, or by another notification mechanism, that they are a member in a collaboration environment. In 502 role rights are selected. Roles are defined with associated rights. Roles can include owner, administrator, contributor, observer, read-only, coordinator, approver, manager, editor, etc. Rights associated with a role can include rights to read, modify, delete, create, copy, write, approve, etc. In 504, rights are assigned to members by assigning a role to each member. Each member is granted the rights that have been associated with the role.

Figure 6:
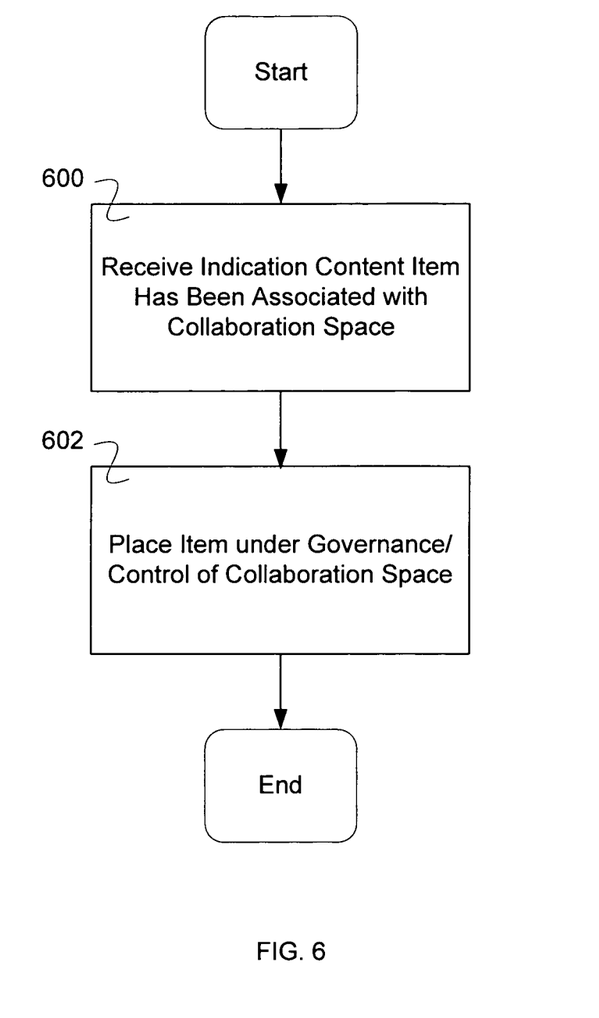
FIG. 6 is a flow diagram illustrating an embodiment of a process for associating content with a collaboration space.

FIG. 6 is a flow diagram illustrating an embodiment of a process for associating content with a collaboration space. In some embodiments, the process of FIG. 6 implements 404 of FIG. 4. In the example shown, in 600 an indication is received that a content item has been associated with a collaboration space. The indication that a content item is associated with a collaboration space can be achieved in various ways including dragging an icon associated with a document into the collaboration window, listing a document in a user interface window during the setup of the collaboration space, selecting a content item using a menu, clicking on content items in a window, or any other appropriate way of indicating that content is associated with a collaboration space. In 602, the item is placed under governance/control of a collaboration space. Once the item is placed under control of the collaboration space visibility of the content item, access to the item by applications and users, and rights for users as applied to the content are governed by the collaboration space. For example, in some embodiments visibility and access are denied to users and applications run by users who are not members of the collaboration space. In some embodiments, by placing the content item under the governance/control of a collaboration space security is imposed on the content item using a container, only collaboration space or container members or applications that are executed by collaboration space or container members have access to the indicated content items.

Figure 7:
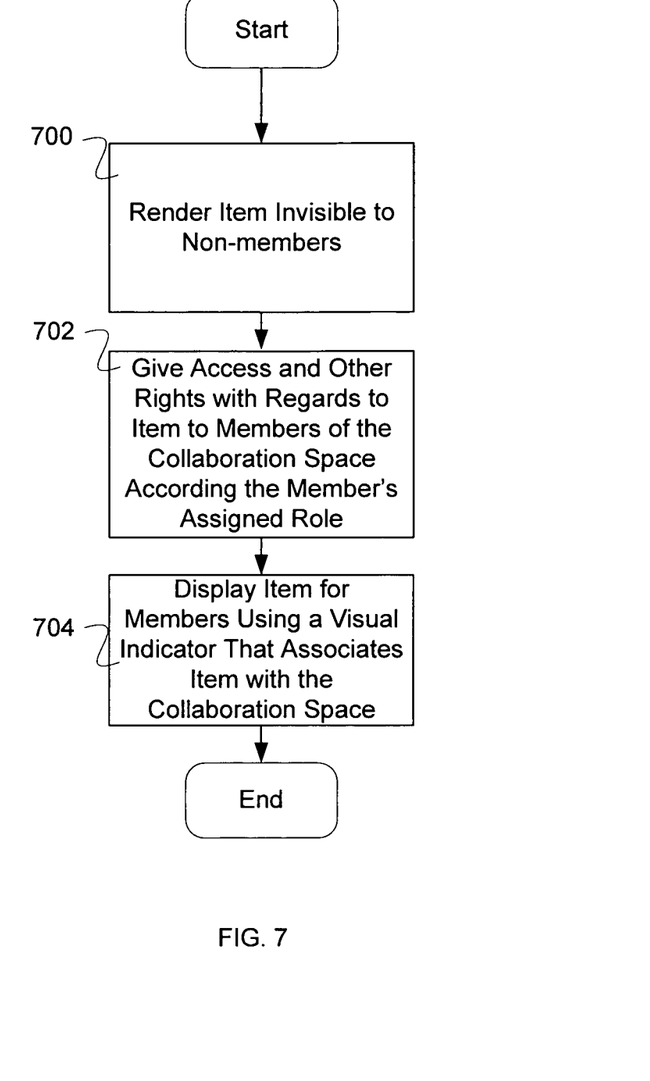
FIG. 7 is a flow diagram illustrating an embodiment of a process for placing item under governance/control of a collaboration space.

FIG. 7 is a flow diagram illustrating an embodiment of a process for placing item under governance/control of a collaboration space. In some embodiments, the process of FIG. 7 implements 602 of FIG. 6. In the example shown, in 700 the item is rendered invisible to non-members of the collaboration space. Content under the control of the collaboration space is not visible to non-member users whether in the collaboration space or in another space—for example, a non-collaboration folder, window, or other system or repository location, including ones in which the content would otherwise be accessible, i.e., if affirmative measures were not being taken to render the content not visible to non-member users. Content under the control of the collaboration space is also not visible when a non-member user searches or uses other applications to access content. In 702, access and other rights are given with regards to items to members of the collaboration space according to the member's assigned role. Access rights are checked by applications and system tools when accessing a content item and if the access rights are not granted—for example if the user is not a member of the collaboration space that the content item is controlled/governed by, then the non-member user is not allowed to access the content item. In 704, the item is displayed for members using a visual indicator that associates item with the collaboration space. In various embodiments, the visual indicator is a variation of a standard icon (for example, a different color, shape, shading, or with an added feature, background, etc.), a different icon, or an icon with added text. In some embodiments, the visual indicator indicates the collaboration space that the content item is associated with. In some embodiments the visual indicator indicates that the content item is controlled by a collaboration space, but does not indicate which collaboration space the item is controlled by.

Figure 8:
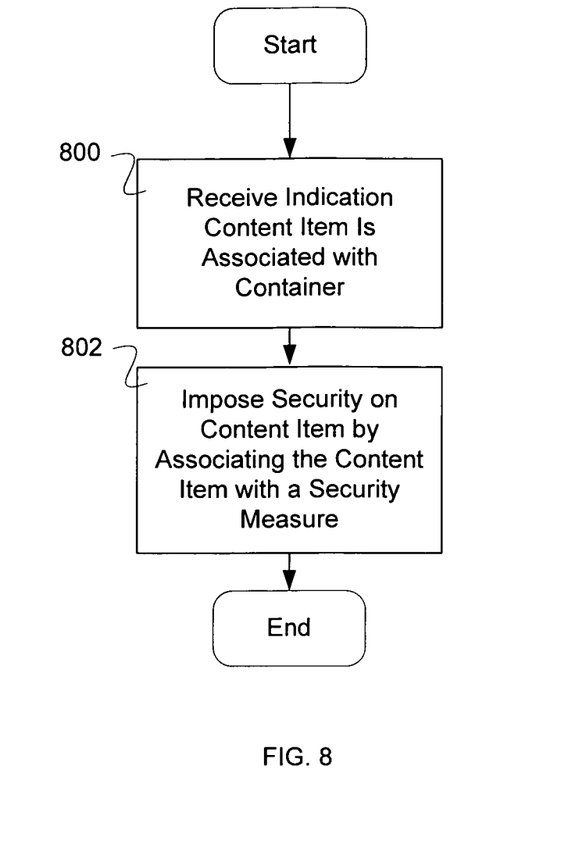
FIG. 8 is a flow diagram illustrating an embodiment of a process for containerized security for managed content.

FIG. 8 is a flow diagram illustrating an embodiment of a process for containerized security for managed content. In some embodiments, the process of FIG. 8 is similar to the process in FIG. 6 and where a container is used to implement security for a collaboration space. In the example shown, in 800 an indication is received that a content item is associated with a container. In various embodiments, a container corresponds to a collaboration space or a role associated with a collaboration space. In various embodiments, the indication is received by dragging content items into the container, selecting content items using a menu, selecting content items by clicking or highlighting in a graphical user interface window, or any other appropriate method for selecting content items. In 802, security is imposed on the content item by associating the content item with a security measure. In some embodiments, by imposing security on the content item, only container members or applications that are executed by container members have access to the indicated content items. In some embodiments, a security measure comprises an access control list.

Figure 9:
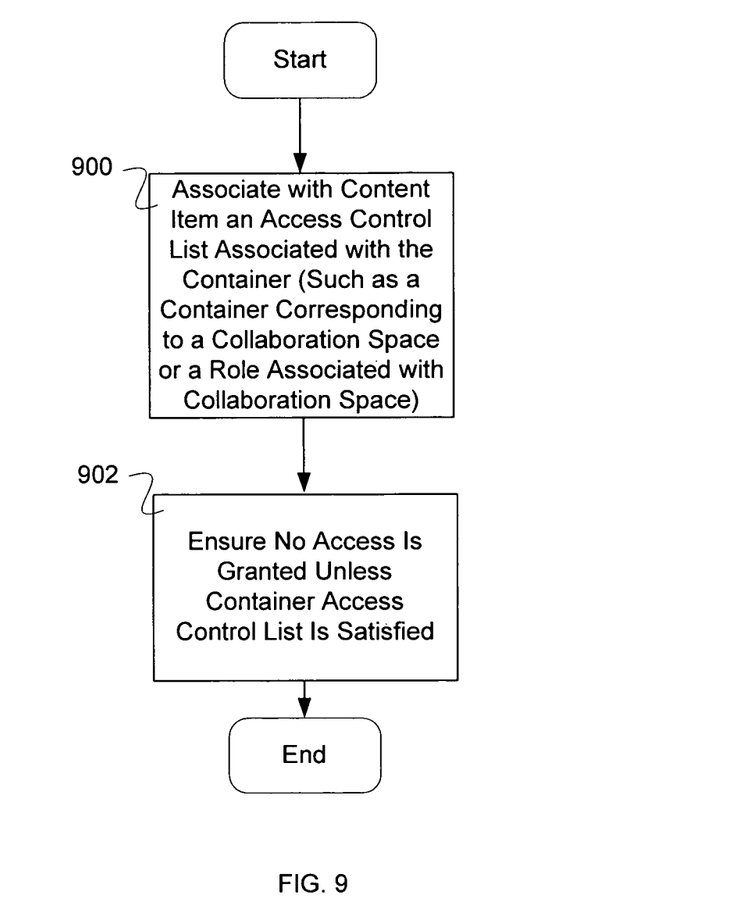
FIG. 9 is a flow diagram illustrating an embodiment of a process for containerized security.

FIG. 9 is a flow diagram illustrating an embodiment of a process for containerized security. In some embodiments, the process of FIG. 9 implements 802 of FIG. 8. In the example shown, in 900 an access control list associated with a container (for example, a container corresponding to a collaboration space or a role associated with a collaboration space) is associated with a content item. In 902, it is ensured that no access is granted unless container access control list is satisfied. In some embodiments, a security measure denies access to the content item by a user who is not associated with the container but who otherwise would have access to the content item within the body of managed content. In various embodiments, a user or a system initiated application checks an access control list on each content item before accessing a content item. In various embodiments, it is ensured that no access is granted unless container access control list is satisfied even in the event that one or more other access control lists are satisfied, such that access would otherwise have been granted, or it is ensured that no access is granted unless container access control list is satisfied even in the event that access rights have been separately (e.g., explicitly) granted. In some embodiments, access control list is associated with the container using an aspect or other logic that is triggered when a content item is linked to a folder or other container associated with a collaboration space. The aspect ensures that applications that perform operations on objects and/or content in the container follow the rules of the access control list. In some embodiments, the aspect triggers a piece of code to run every time an application accesses objects or content in the container so that the rules of the aspect are enforced.

In some embodiments, an aspect or logic associated with the container is triggered when a content item is linked to a collaboration space folder or other container, or set to be triggered by a subsequent event, such as a "save" event. The aspect or logic—causes a database object used to represent the content item, and/or all of its constituent parts in the case of a complex content item, such as an email having one or more attachments, are accessible only to members of the collaboration. In some embodiments, access is limited at least in part by associating with the content item a mandatory access control list (MACL) that must be satisfied, i.e., a user associated with a request to access the content item must be included in the MACL, in order to access the content item. In some embodiments, a user otherwise entitled to access the content item, e.g., by virtue of the user's role and/or other attributes and/or privileges with respect to the body of managed content generally, but not included in the MACL, is denied access. In some embodiments, the aspect or other logic described above ensures that content items linked to a folder or other container associated with the collaboration space become associated with the MACL and/or the business logic used to enforce it.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method for containerized security comprising:

determining a user would be granted an access right to a content item included in a body of managed content based on an existing access control list ("ACL")

imposed on the content item by virtue of a privilege of the user with respect to the body of managed content generally;

wherein the existing ACL is a security measure imposed on a specific content item that grants access to the specific content item based at least in part on the privilege of the user;

receiving an indication that the content item is associated with a container, wherein the container implements security for one or more content items associated with a collaboration space created by a collaboration software;

using an aspect to trigger a piece of code to run every time an application accesses the content item so that the rules of a container mandatory access control list ("MACL") are enforced;

wherein the user must be included in the container MACL in order to access the content item;

determining the user that would be granted an access right based on the existing ACL is not included in the container MACL;

using an application server to render the content item invisible within a collaboration space window to the user that would be granted an access right based on the existing ACL, based at least in part on the determination the user is not associated with the container;

wherein the collaboration space window displays i) content items that are not exclusively governed by a collaboration space rule, and ii) content items governed by a collaboration space rule and indicated as so visually; and ensuring the user that would be granted an access right based on the existing ACL is not granted the access right to the content item unless the container MACL is satisfied.

2. A method as in claim 1, wherein the user who is not associated with the container comprises a first user and further including allowing access to the content item by a second user who is associated with the container.

3. A method as in claim 2, wherein not granting the access right includes executing based at least in part on the indication a process that associates with the content item the aspect configured to deny access to the content item by the user who is not associated with the container.

4. A method as in claim 3, wherein associating with the content item the aspect configured to deny access to the content item by the user who is not associated with the container includes adding to a database object used to represent the content item in the body of managed content a link or other attribute that associates the content item with the aspect.

5. A method as in claim 4, wherein the container MACL is associated with the container associated with the collaboration space.

6. A method as in claim 5, wherein the container MACL is associated with the container associated with a role associated with the collaboration space.

7. A method as in claim 6, wherein ensuring includes ensuring no access is granted unless the container MACL is satisfied even in the event that access rights have been separately granted.

8. A method as recited in claim 7, wherein the user is granted an access right associated with the content item based on the existing ACL associated with the content item, but the user is denied access based on the container MACL.

9. A method as recited in claim 8, wherein the user is in a subset of content management system users, wherein members of the subset would be granted an access right to the content item but others do not.

10. A method as recited in claim 9, wherein the aspect is triggered when the content item is associated with the container by a "save" event.

11. A computer program product for containerized security, the computer program product being embodied in a non-transitory computer readable medium and comprising computer instructions for:

determining a user would be granted an access right to a content item included in a body of managed content based on an existing access control list ("ACL") imposed on the content item by virtue of a privilege of the user with respect to the body of managed content generally;

wherein the existing ACL is a security measure imposed on a specific content item that grants access to the specific content item based at least in part on the privilege of the user;

receiving an indication that the content item is associated with a container, wherein the container implements security for one or more content items associated with a collaboration space created by a collaboration software;

using an aspect to trigger a piece of code to run every time an application accesses the content item so that the rules of a container mandatory access control list ("MACL") are enforced;

wherein the user must be included in the container MACL in order to access the content item;

determining the user that would be granted an access right based on the existing ACL is not included in the container MACL;

rendering the content item invisible within a collaboration space window to the user that would be granted an access right based on the existing access control list ACL, based at least in part on the determination the user is not associated with the container;

wherein the collaboration space window displays i) content items that are not exclusively governed by a collaboration space rule, and ii) content items governed by a collaboration space rule and indicated as so visually; and ensuring the user that would be granted an access right based on the existing ACL is not granted the access right to the content item unless the container MACL is satisfied.

12. A computer program product as recited in claim 11, wherein the user who is not associated with the container comprises a first user and further including allowing access to the content item by a second user who is associated with the container.

13. A computer program product as recited in claim 11, wherein not granting access includes executing based at least in part on the indication a process that associates with the content item a business logic configured to deny access to the content item by the user who is not associated with the container.

14. A system for containerized security comprising:
a processor; and
a memory coupled with the processor, wherein the memory is configured to provide the processor with instructions which when executed cause the processor to:
determine a user would be granted an access right to a content item included in a body of managed content based on an existing access control list ("ACL")

imposed on the content item by virtue of a privilege of the user with respect to the body of managed content generally;

wherein the existing ACL is a security measure imposed on a specific content item that grants access to the specific content item based at least in part on the privilege of the user;

receive an indication that the content item is associated with a container, wherein the container implements security for one or more content items associated with a collaboration space created by a collaboration software;

use an aspect to trigger a piece of code to run every time an application accesses the content item so that the rules of a container mandatory access control list ("MACL") are enforced;

wherein the user must be included in the container MACL in order to access the content item;

determine the user that would be granted an access right based on the existing ACL is not included in the container MACL;

render the content item invisible within a collaboration space window to the user that would be granted an access right based on the existing access control list ACL, based at least in part on the determination the user is not associated with the container;

wherein the collaboration space window displays i) content items that are not exclusively governed by a collaboration space rule, and ii) content items governed by a collaboration space rule and indicated as so visually; and ensure the user that would be granted an access right based on the existing ACL is not granted the access right to the content item unless the container MACL is satisfied.

15. A system as recited in claim 14, wherein the user who is not associated with the container comprises a first user and further including allowing access to the content item by a second user who is associated with the container.

* * * * *